United States Patent [19]

Bacino

[11] Patent Number: 5,476,589
[45] Date of Patent: Dec. 19, 1995

[54] PORPOUS PTFE FILM AND A MANUFACTURING METHOD THEREFOR

[75] Inventor: John Bacino, Landenberg, Pa.

[73] Assignee: W. L. Gore & Associates, Inc., Newark, Del.

[21] Appl. No.: 403,232

[22] Filed: Mar. 10, 1995

[51] Int. Cl.⁶ .................................................. B01D 71/36
[52] U.S. Cl. ...................................... 210/500.36; 210/507
[58] Field of Search ..................... 264/288.8, DIG. 73; 210/500.36, 505, 507, 508

[56] References Cited

U.S. PATENT DOCUMENTS 4,645,602  2/1987  Barnes, Jr. et al. .................... 210/490
4,902,423  2/1990  Bacino .
5,234,739  8/1993  Tanaru et al. .

Primary Examiner—Frank Spear

[57] ABSTRACT

A nonwoven web is described that is a thin porous polytetrafluoroethylene membrane consisting essentially of a nonwoven web having a microstructure of substantially only microfibrils fused at crossover points. It is usually strong, is unusually thin, has unusually small pore sizes, but a very high air flow-through. It has a pore size between 0.05 and 0.4 micrometers; a bubble point between 10 and 60 psi; a pore size distribution value between 1.05 and 1.20; a ball burst strength between 0.9 and 17 pounds/force; an air flow of between 20 Frazier and 10 Gurley seconds; a thickness between 1.0–25.4 micrometer; and a fiber diameter ranging between 5 and 200 nm.

3 Claims, 3 Drawing Sheets

PORPOUS PTFE FILM AND A MANUFACTURING METHOD THEREFOR

FIELD OF THE INVENTION

The present invention concerns a polytetrafluoroethylene (hereinafter referred to as PTFE) porous film, and a manufacturing method therefor. The film is useful in filtration, clothing, medical or electrical applications.

BACKGROUND OF THE INVENTION

A method is known for preparing stretched porous polytetrafluoroethylene (ePTFE) by paste extruding or rolling a polytetrafluoroethylene (PTFE) fine powder and a lubricant, and then drawing the article after the lubricant has been removed.

The stretched product ordinarily has a microstructure of nodes interconnected with numerous generally parallel fibrils. Commonly, after the lubricant is removed, the PTFE article, usually in film form, is stretched in its unsintered state. The basic technology for this is found in U.S. Pat. No. 4,187,390 and U.S. Pat. No. 3,953,566.

A PTFE with a low amorphous content and a degree of crystallization of at least 98% is considered to be the PTFE fine powder that is best suited to this method. When such a PTFE fine powder is mixed with a mineral spirit, naphtha, or another such lubricant, it absorbs this lubricant and turns into a paste. It is well known that this PTFE paste can be economically molded by extrusion molding, calender molding, or another molding method that imparts shear deformation. The paste is usually molded into a tube, a rod, a tape, or some other such cross sectional shape. After molding, the lubricant is removed from the molded article, usually by drying. Then, after the lubricant has been removed, the molded article is drawn, i.e., stretched, to give it a porous structure. With the method that involves drawing in an unsintered state, the molded article from which the lubricant has been removed is drawn in the direction of one or more axes at a temperature below the melting point of PTFE, but preferably near the melting point. After drawing, the porous molded article usually is heated to a temperature above the melting point of PTFE and then cooled, in order to fix the microstructure of the article. The degree of sintering of the product is controlled by adjusting the maximum temperature or the length of time at which the article is kept at this temperature as dictated by the intended use of the finished product. Depending on the application, there are cases in which no sintering treatment is performed.

A molded article produced by drawing in an unsintered state becomes porous, and is filled with micropores. The nature of the microstructure is determined by the drawing temperature, drawing rate, draw ratio, and other factors. The microstructure is composed of a vast number of fibers and nodules that are linked together by the fibers, and the size and arrangement of the nodules will vary with the drawing conditions. For instance, if the article is drawn uniaxially, the nodules will be arranged in the form of islands at a right angle to the drawing direction, and the fibers that link the nodules together will be arranged parallel to the drawing direction. And when the article is drawn biaxially, the nodules will consist of particles or an aggregation of a few to hundreds of particles of fine powder, and the fibers that link them together will be oriented two-dimensionally from the nodules, with the degree of this orientation varying with the drawing conditions. With conventional porous films, the fiber diameter is very fine (approximately 0.1 μm), and nodules are very large, in some cases reaching approximately 400 μm.

A characteristic of this approach to making a porous article by drawing in an unsintered state is that the size in the direction at a right angle (perpendicular direction) to the molded article drawing direction does not vary in the drawing process. In other words, there is only minimal change in the thickness and width of the molded article with uniaxial drawing, and in the thickness of the molded article with biaxial drawing. This indicates that an increase in volume is the result of an increase in porosity, i.e., a decrease in density. This increase in porosity is caused by an increase in the voids, i.e., the space, between the nodules, and by the larger space that is created as the number and length of fine fibers increase. Consequently, with a method that involves drawing in an unsintered state it is fundamentally difficult to manufacture a film that is thinner than the original molded article.

Thin, porous membranes of stretched PTFE are taught in U.S. Pat. No. 4,902,423 to Bacino, but the membranes have very large pores.

Stretched porous PTFE films having small pore sizes (for microfiltration) and small nodes are described in U.S. Pat. No. 5,234,739 (Daikin, Ind.) to Tanaru, et al., but they are produced by stretching a semi-sintered PTFE.

SUMMARY OF THE INVENTION

It would be desirable to produce a very thin, very strong, porous PTFE nonwoven web composed substantially of fibrils in which there were no nodes present to impede air flow. The result would be a thin, strong web that had high air flow, while at the same time having small pore size.

The nonwoven web of this invention is unusually strong, unusually thin, has unusually small pore sizes, but a very high air flow-through. It is a thin porous polytetrafluoroethylene membrane consisting essentially of a nonwoven web having a microstructure of substantially only microfibrils fused at crossover points, said membrane having:

(a) a pore size between 0.05 and 0.4 micrometers, and preferably less than 0.2;
(b) a bubble point between 10 and 60 psi;
(c) a pore size distribution value between 1.05 and 1.20;
(d) a ball burst strength between 0.9 and 17 pounds/force;
(e) an air flow of between 20 Frazier and 10 Gurley seconds;
(f) a thickness between 1.0–25.4 micrometers.

The fiber diameter ranges predominantly between 5 and 200 nm, preferably 10 and 150 nm.

The pore size, pore distribution, and bubble point all indicate the small uniform nature of the pore space, while the high air-flow values indicate that a myriad of pores are present. Despite the presence of numerous pores and despite the thinness, the membrane is unusually strong as shown by the ball burst values.

The novel membranes are prepared by employing a relatively thick extruded lubricated film of polytetrafluoroethylene about 20–30 mils thick (500–750 micrometer) or more and processing it by stretching traversely less than 3 X, drying, then stretching longitudinally 10–100 X, then longitudinally again between 1:1 and 1.5:1 X, and again traversely stretching while constrained from shrinking.

The webs of the invention appear glossy and have a high sheen, giving a silk-like appearance.

DETAILED DESCRIPTION OF THE INVENTION

Figure 1:
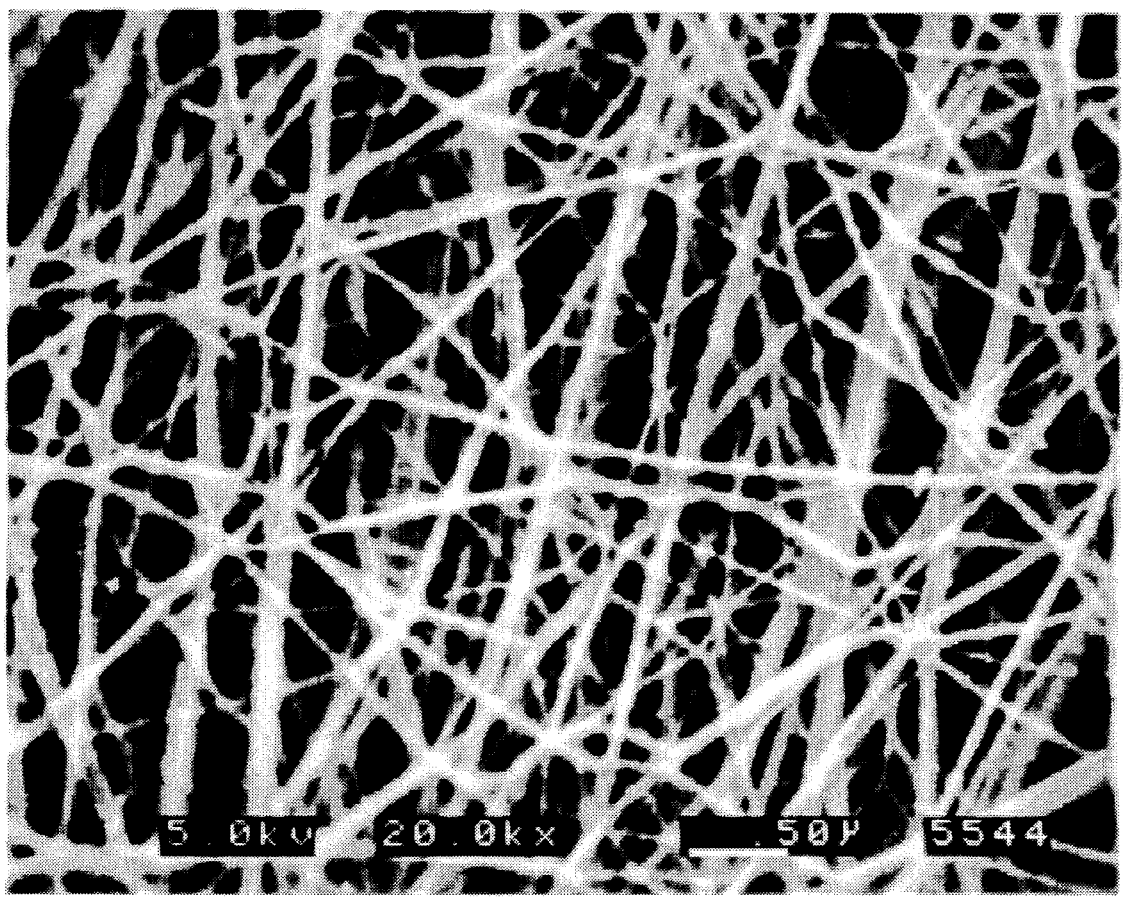
FIG. 1 is an SEM of the web of the invention produced by Example 1 at 20000 X magnification.

To manufacture the PTFE nonwoven web, a PTFE fine powder that has a low amorphous content and a degree of crystallization of at least 98% is used as the raw material. This PTFE fine powder is made into a paste by uniformly mixing it with an extrusion aid of a mineral spirit, naphtha, or other such lubricant. This paste is then molded into the shape dictated by the intended use of the finished product by a molding method that imparts shear deformation, such as extrusion molding or calender molding. It is usually molded into the form of a tape by extrusion, but the shape is not necessarily limited to this, and the article may be molded into a variety of cross sectional shapes, such as a rod or tube, according to the intended use of the finished product.

The polytetrafluoroethylene used herein is coagulated dispersion or fine powder polytetrafluoroethylene. Several such resins that have been used demonstrate that the various commercially available fine powders from the several suppliers of such resins are suitable in the process. Some such resins can tolerate more extrusion aid than others and still yield products within the range of permeability desired. Some such resins suitable for use are Fluon® CD-123 and Fluon CD-1 available from ICI Americas, Inc., although there is some batch to batch variability which alters how much they can be expanded. E. I. dupont de Nemours and Co., Inc., also manufacture Teflon® fine powders that are suitable for use.

The coagulated dispersion powders are lubricated with a hydrocarbon extrusion aid, preferably as odorless mineral spirit such as Isopar K (made by Exxon Corp.). The lubricated powder is compressed into cylinders and extruded in a ram extruder to form tapes. Two or more layers of tape can be stacked together and compressed between two rolls. The tape or tapes are compressed between rolls to an appropriate thickness, e.g. 5 to 40 mils, or so. The wet tape is stretched traversely to 1.5 to 5 times its original width. The extrusion aid is driven off with heat. The dried tape is then expanded longitudinally between banks of rolls in a space heated to a temperature that is below the polymer melting point (327° C.). The longitudinal expansion is such that the ratio of speed of the second bank of rolls to the first bank is 10–100 to 1. The longitudinal expansion is repeated at a 1–1.5 to 1 ratio.

Next, the tape, after the longitudinal expansion, is expanded traversely at a temperature that is less than 327° C. to at least 1.5 times and preferably to 6 to 15 times the input width of the original extrudate while restraining the membrane from longitudinal contraction. While still under constraint the membrane is preferably heated to above the polymer melting point (327° C.) and then cooled.

By this process an open or porous, but strong structure that provides the high air permeability of the webs of the invention is obtained.

The PTFE webs of the present invention find many user, such as in air filters, as a cell diaphragm, a humidifier diaphragm, or a pervaporation diaphragm. They can also be used as a fabric material that is used in applications that require a clean environment.

TEST PROCEDURES

Bubble Point Test

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point was measured according to the procedures of ASTM F316-86. Isopropyl alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

PORE SIZE AND PORE SIZE DISTRIBUTION

Pore size measurements are made by the Coulter Porometer™, manufactured by Coulter Electronics, Inc., Hialeah, Fla.

The Coulter Porometer is an instrument that provides automated measurement of pore size distributions in porous media using the liquid displacement method (described in ASTM Standard E1298-89.

The Porometer determines the pore size distribution of a sample by increasing air pressure on the sample and measuring the resulting flow. This distribution is a measure of the degree of uniformity of the membrane (i.e. a narrow distribution means there is little difference between the smallest and largest pore size). It is found by dividing maximum pore size by the minimum pore size.

The Porometer also calculates the mean flow pore size. By definition, half of the fluid flow through the filter occurs through pores that are above or below this size. It is the mean flow pore size which is most often linked to other filter properties, such as retention of particulates in a liquid stream. The maximum pore size is often linked to the Bubble Point because bulk air flow is first seen through the largest pore.

Ball Burst Test

This text measures the relative strength of a sample of web by determining the maximum load at break. The web is challenged with a 1 inch diameter ball while being clamped between two plates. The Chatillon, Force Gauge/Ball Burst Test was used.

The web is placed taut in the measuring device and pressure affixed by raising the web into contact with the ball of the ball burst probe. Pressure at break is recorded.

Air Flow Data

The Gurley air flow test measures the time in seconds for 100 cc of air to flow through a one square inch sample at 4.88 inches of water pressure. The sample is measured in a Gurley Densometer (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number.

The Frazier air flow test is similar but is mostly used for much thinner or open membranes. The test reports flow in cubic feet per minute per square foot of material.

Air permeability was measured by clamping a test sample in a gasketed flanged fixture which provided in circular area of approximately 6 square inches (2.75 inches diameter) for air flow measurement. The upstream side of the sample fixture was connected to a flow meter in line with a source of dry compressed air. The downstream side of the sample fixture was open to the atmosphere.

Testing was accomplished by applying a pressure of 0.5 inches of water to the upstream side of the sample and recording the flow rate of the air passing through the in-line flowmeter (a ball-float rotameter).

The sample was conditioned at 70° C. and 65% relative humidity for at least 4 hours prior to testing.

Results are reported in terms of Frazier Number which is air flow in cubic feet/minute/square foot of sample at 0.5 inches water pressure.

Water Entry Pressure

Water entry pressure provides a test method for water intrusion through membranes. A test sample is clamped between a pair of testing plates. The lower plate has the ability to pressurize a section of the sample with water. A piece of pH paper is placed on top of the sample between the plate on the nonpressurized side as an indicator of evidence for water entry. The sample is then pressurized in small increments, waiting 10 seconds after each pressure change until a color change in the pH paper indicates the first sign of water entry. The water pressure at breakthrough or entry is recorded as the Water Entry Pressure. The test results are taken from the center of test sample to avoid erroneous results that may occur from damaged edges.

Thickness was determined using a Heidenbain Thickness Tester.

Fiber Diameter

Fiber diameter was determined by taking an SEM (FIG. 3) of a sample at 50,000 magnification, and measuring the diameter with a ruler of the largest and the smallest fiber (as determined by eye estimate).

EXAMPLE 1

PTFE fine powder (duPont) was blended with Isopar K at a rate of 115 cc a pound of fine powder. The lubricated powder was compressed into a cylinder and was ram extruded at 70° C. to provide a tape. The tape was split into two rolls and layered together and compressed between rolls to a thickness of 0.030 inch then was stretched transversely to 2.6 times its original width. The Isopar K was driven off by heating to 210° C. The dry tape was expanded longitudinally between banks of rolls in a heat zone heated to 300° C. The ratio of speed of the second bank of rolls to the first bank of rolls was 35:1 and the third bank of rolls to the second bank of rolls was 1.5: 1 for a total of 52:1 longitudinal expansion producing a 3.5 inches wide tape. The 3.5 inches wide tape was heated to 295° C. and transverse expanded 13.7 times in width while constrained from shrinkage and then heated to 365° C. while still constrained. This process produced a web-like membrane.

EXAMPLES 2–9

These examples were carried out as described in Example 1, except for the differences shown in Table 1.

TABLE 1

| Examples | Lubricant Data | Numbers of Layers | Thickness (μm) | Long Exp./1 | Long Exp./2 | Total Long Exp. | Speed MPM/ FPM | Width Ater Long Exp. (in.) | |
|---|---|---|---|---|---|---|---|---|---|
| | | | | | | | | in. | mm |
| 1 | 115 cc | 2 | 762 | 35:1 | 1.5:1 | 52.5:1 | 12.2 40 | 3.5 | 88.9 |
| 2 | 115 cc | 3 | 508 | 22.5:1 | 1.5:1 | 35.4 | 12.2 40 | 4.5 | 114.3 |
| 3 | 115 cc | 3 | 762 | 45:1 | 1.5:1 | 67.5 | 6.1 20 | 3.5 | 88.9 |
| 4 | 125 cc* | 1 | 685 | 60:1 | 1.5:11 | 90:1 | 12.2 40 | 3.562 | 90.5 |
| 5 | 125 cc* | 1 | 685 | 96:1 | 1.5:11 | 144:1 | 12.2 40 | 5.312 | 134.9 |
| 6 | 115 cc | 2 | 508 | 16:1 | 1:1 | 16:1 | 3.0 10 | 3.875 | 98.4 |
| 7 | 115 cc | 3 | 508 | 10:1 | 1:1 | 10:1 | 6.1 20 | 3.75 | 95.2 |
| 8 | 115 cc | 3 | 508 | 15:1 | 1:1 | 15:1 | 6.1 20 | 3.625 | 92.0 |
| 9 | 115 cc | 3 | 508 | 23:1 | 1:1 | 23:1 | 6.1 20 | 4.875 | 123.8 |

Long. Exp. = Longitudinal Expansion
FPM = Feet Per Minute
cc = cubic centimeters
*at 90° C.

Thickness

Property data on the samples produced by Examples 1–9 are shown in Table 2.

TABLE 2

| Examples | Air Flow G/F | Bubble Point Kpa PSI | Thickness (μm) | Ball Burst Kg. lbs. Forces | WEP PSI Kpa PSI | Pore Size μm Max. | Min. | Mean | Max./Min. |
|---|---|---|---|---|---|---|---|---|---|
| 1 | 3.4 F | 206 30 | 1.52 μm | 1.4 3.1 | 193 28 | | | | |
| 2 | 3.2 F | 138 20 | 2.5 μm | 1.5 3.4 | 310 45 | | | | |
| 3 | 10 F | 72 10.5 | 2.5 μm | 0.77 1.7 | | | | | |
| 4 | 8 F | 127.5 18.5 | 2.5 μm | 0.68 1.5 | | | | | |
| 5 | 17.5 F | 65.5 9.5 | 2.5 μm | 4.08 9 | 13.8 2 | | | | |
| 6 | 3.3 G | 310 45 | 10.16 μm | 3.08 6.8 | 382 55.4 | .197 | .135 | .162 | 1.21 |
| 7 | 10 G | 379 55 | 25.4 μm | 7.48 16.5 | 2706 320 | .125 | .092 | .113 | 1.10 |
| 8 | 5.7 G | 337 49 | 17.7 μm | 5.3 11.7 | 2103 305 | .147 | .115 | .134 | 1.10 |
| 9 | 1.5 G | 241 35 | 5 μm | 2.45 5.41 | | | | | |

G = Gurley Number
F = Frazier Number
WEP = Water Entry Pressure

As seen in FIG. 1, the web representative of Example 1 is composed of a number of microfibrils with numerous crossover points, thus allowing for numerous interconnected spaces or pores.

Figure 2:
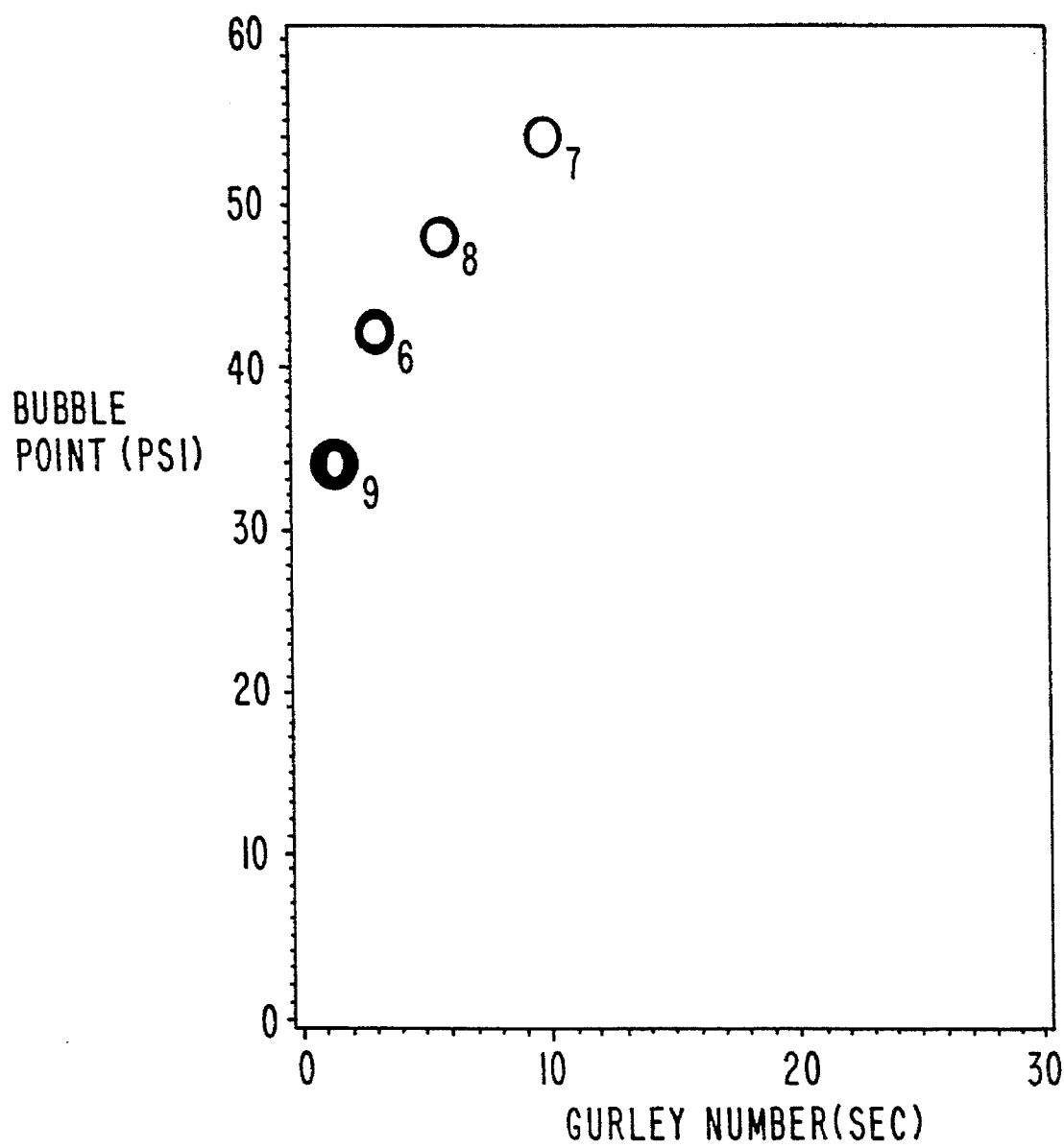
FIG. 2 is a graph plotting bubble point versus Gurley Number for several samples of webs of the invention.

As seen in FIG. 2, the webs of the invention have high bubble points indicating relatively small pores, and low Gurley numbers indicating high air flow-through.

Figure 3:
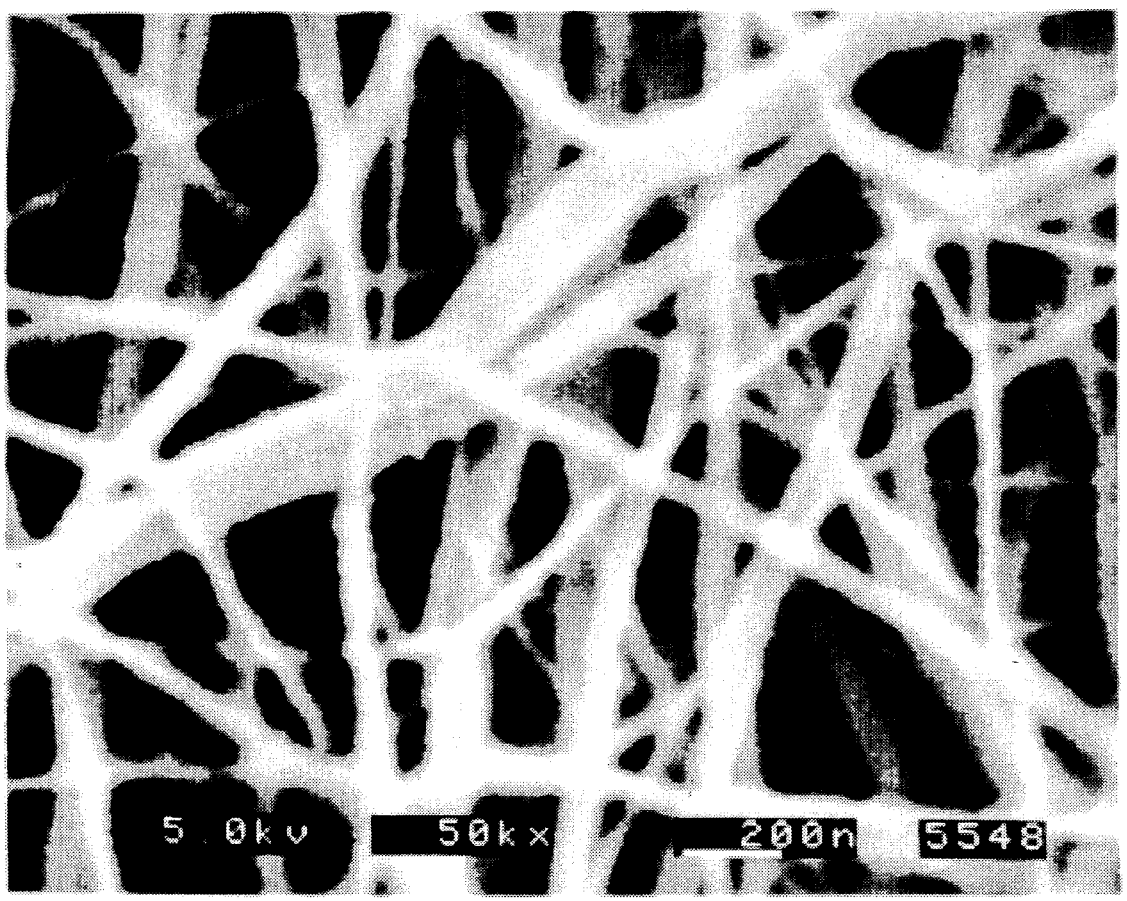
FIG. 3 is an SEM of the web produced by Example 1 at 50000 X magnification.

FIG. 3 is an SEM which was used to determine a maximum fiber diameter of 150 nm and a minimum diameter of 10 nm. The web of Example 1. Nm refers to nanometers.

I claim:

1. A thin porous polytetrafluoroethylene membrane consisting essentially of a nonwoven web having a microstructure of substantially only microfibrils fused at crossover points, said membrane having:

(a) a pore size between 0.05 and 0.4 micrometers;

(b) a bubble point between 10 and 60 psi;

(c) a pore size distribution value between 1.05 and 1.20;

(d) a ball burst strength between 0.9 and 17 lbs./Force;

(e) an air flow of between 20 Frazier number and 10 Gurley seconds;

(f) a thickness between 1–25.4 micrometers.

2. The membrane of claim 1 wherein the pore size is between 0.05 and 0.2 micrometer; the bubble point is between 20–55; the air flow is between 10 Frazier Number and 6 Gurley Seconds; and the fiber diameter is between 5 and 200 nm.

3. Process for preparing the membrane of claim 1 which comprises employing a relatively thick extruded lubricated film of polytetrafluoroethylene about 20–30 mils thick or more and processing it by stretching traversely less than 3 X, drying, then stretching longitudinally 10–100 X, then longitudinally again between 1:1 and 1.5:1 X, and again traversely stretching while constraining the film shrinking.

* * * * *